Feb. 8, 1938.  J. M. WADSWORTH  2,107,354
APPARATUS FOR DECOLORIZING OR DESULPHURIZING HYDROCARBONS
Filed Dec. 20, 1928
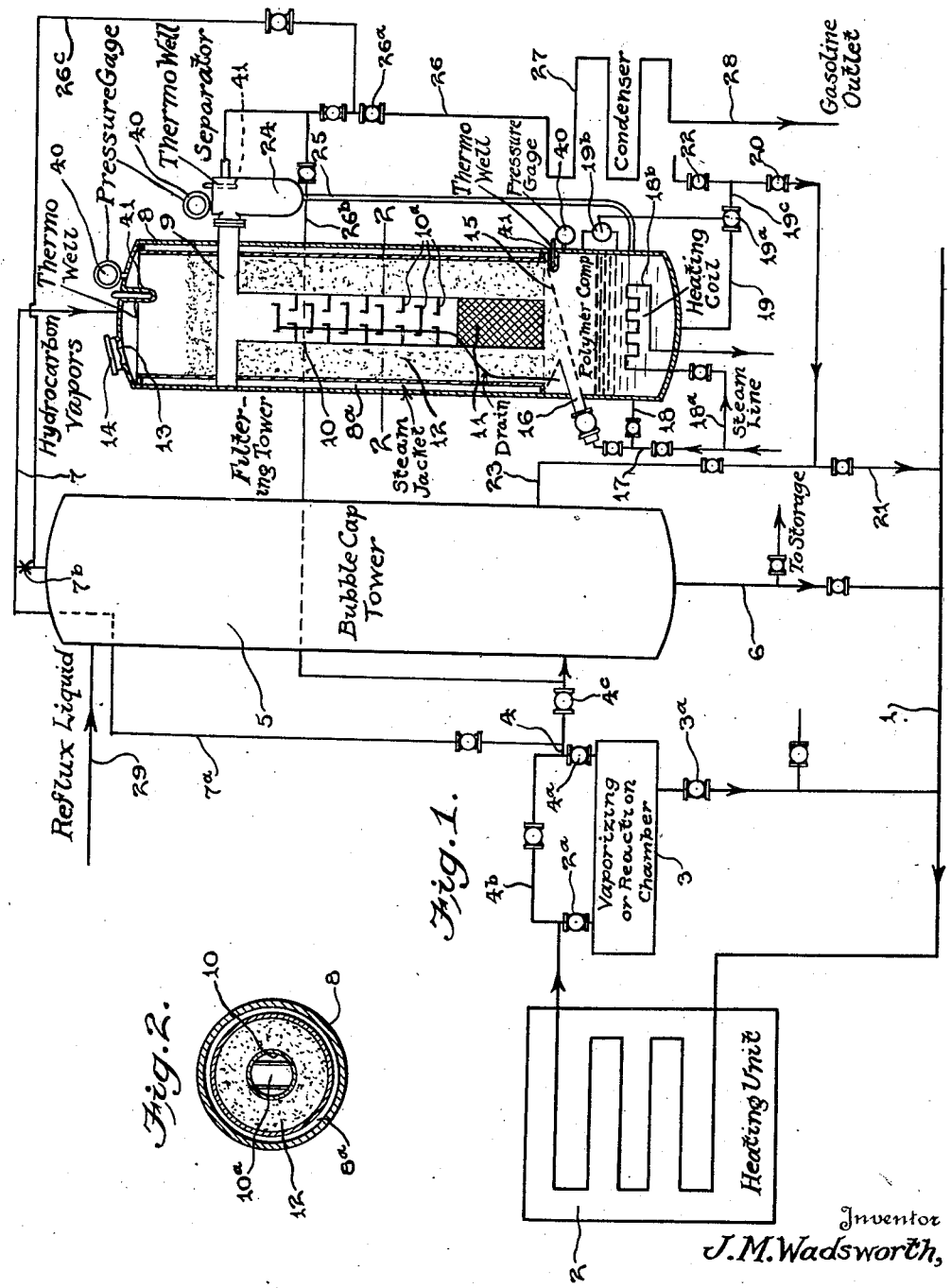
Inventor
J. M. Wadsworth,
By George A. Prevost
Attorney Patented Feb. 8, 1938

2,107,354

UNITED STATES PATENT OFFICE 2,107,354

APPARATUS FOR DECOLORIZING OR DE-SULPHURIZING HYDROCARBONS

James M. Wadsworth, Tulsa, Okla.

Application December 20, 1928, Serial No. 327,446

22 Claims. (Cl. 196—28)

This invention relates to the decolorizing or desulphurizing of hydrocarbons, and more particularly to a novel apparatus for decolorizing and/or desulphurizing hydrocarbon vapors or for separating polymers from such vapors.

Prior to this invention, I proposed in my Patent No. 1,960,561, granted May 29, 1934, to treat hydrocarbon vapors by an improved process involving the use of a treating agent having the catalytic characteristics of fuller's earth, and the present application is a continuation in part of my application for said patent.

In the invention forming the subject matter of the present application, gasoline or other hydrocarbon vapors undergoing treatment are passed downwardly through fuller's earth or similar catalytic material which converts certain unsaturated hydrocarbons into polymers, that are condensed under the operating conditions in the treating agent. My apparatus separates the sulphur, polymers or other coloring matter from the vapor, and thus produces a product free of polymers or sulphur, which is more stable to light, and consequently, of better marketing value.

One of the primary objects of my invention is to provide an apparatus including a filtering tower containing fuller's earth or the like, through which the vapors are first passed downwardly. The catalyst is supported in the tower by a perforated grid or the like, in order that the condensates may drain from the catalyst into the bottom portion of the tower. The vapors, after passing through the catalyst, then pass upwardly through a dephlegmator section arranged in the tower, and this section is of such design that condensate and polymers entrained by the vapor are separated and discharged into the polymer compartment.

Another object of the invention is to provide an apparatus which may be used to distill or crack hydrocarbons and to decolorize and/or desulphurize the hydrocarbon vapors.

With the foregoing objects outlined and with other objects in view which will appear as the description proceeds, my invention consists in the novel features hereinafter set forth in detail, illustrated in the accompanying drawing, and more particularly pointed out in the appended claims.

Referring to the drawing,

Fig. 1 is a diagrammatic view of a combined hydrocarbon oil distilling or cracking plant connected up with my improved filtering apparatus, the latter being shown in vertical section.

Fig. 2 is a horizontal sectional view taken on line 2—2 of Fig. 1.

In the following detail description, I will first describe the apparatus as used for decolorizing hydrocarbon vapors.

In the drawing, it may be seen that the gas oil or other hydrocarbon charging stock is pumped by way of the line 1 through the heating unit 2. From said unit, if the apparatus is used for cracking purposes, the oil travels by way of valved pipe 2a, into a vaporizing and reaction chamber 3. If the cracking process is such that there is a separation of vapor from liquid in this chamber, the liquid may be discharged by way of valved pipe 3a, and this liquid may be recycled or be used for fuel.

Hydrocarbons leaving the reaction chamber are fed by way of pipe 4 into a rectifying column 5 which may be of the bubble tray type, and if the cracking is in the liquid phase, a valve 4a on the line 4 may be used to hold the pressure on the reaction chamber and heating unit.

A valved by-pass pipe 4b permits the apparatus to be used for ordinary distillation, and without cracking, and when the by-pass is open and the reaction chamber is cut off, the vapors and the residuum evolved in the heating unit may simply pass directly into the rectifying column.

As is usual in rectifying columns, the vapors rise and the reflux descends, and as the vapors pass upwardly, some of them are condensed, and this condensate flows downwardly counter-current to the vapors; the reflux or condensate passing out at the bottom of the tower through a pipe 6 to storage or back into the pipe 1 for recycling.

The vapors and uncondensed gas discharge from the top of the tower into valved pipe 7, which leads the same into the top of the filtering tower 8. This tower is of special construction, and is provided internally with a cross pipe 9 from which a vertical pipe or dephlegmator section 10 depends. The lower end of this pipe is provided with a grating or screen 11 to prevent the fuller's earth or other catalytic material 12 within the column, from entering said pipe, while permitting free entrance of vapors and gases into the pipe.

Baffle trays or the like 10a are arranged in the pipe 10 and a drain pipe 10b leads all the liquid gathering in these trays to the polymer compartment at the lower end of the tower, so as to prevent any commingling of vapors and liquid as soon as the latter has been separated.

The filtering material may be fed into the tower by way of a manhole 13 having a removable cover 14, and the material is supported within the tower by a cone-shaped partition or false bottom 15, formed of foraminous material and spaced from the bottom of the tower to permit the polymers or other condensates to form a pool in the bottom portion of the tower.

An outlet for the catalyst is shown at 16, and steam for cleaning the filtering material may be introduced into the column by way of valved pipe 17 which has a valved branch 18 leading into the polymer compartment.

Another branch 18a from the steam line leads to a heating coil 18b arranged in the polymer compartment below the condensate level, and by means of this coil, the polymer compartment may be maintained at a desired temperature to eliminate lighter constituents from the polymer or other condensates.

A conduit 19 for discharging condensates from the filtering tower is connected to the lower end of the latter and is provided with a valve 19a regulated by a float control 19b which communicates with the polymer compartment, both above and below the normal liquid level. As is usual with such float controls, when the liquid rises in the polymer compartment, the valve 19a will be opened to permit the condensates to discharge into the line 19c, from which they may be passed by way of valve 20, into a valve branch 21, leading to the feed line 1, in order that the condensates may be recycled. If they are not to be recycled, they may be discharged by way of valved pipe 22.

A valved conduit 23 connects the pipe 21 to an intermediate portion of the rectifier 5, so that condensate from a point at a higher elevation than the bottom of the rectifier may be recycled.

The pipe 9 is connected to a separator 24 having a condensate drain pipe 25 leading to the polymer compartment of the filtering tower. Vapors and gases are discharged from the separator through pipe 26, which is connected to a condenser 27 having an outlet pipe 28 for delivering the distillate.

A valve 26a in the line 26, permits any desired pressure to be maintained on the fractionating column and filter.

The top of the filtering tower, the top of the separator 24, and the polymer compartment are each provided with a pressure gauge 40 and a thermometer well 41.

In operating the apparatus, as before stated, the oil may be distilled without cracking, or may be cracked before entering the rectifier 5, and the vapors discharged from the top of the rectifier are fed into the top of the filtering tower. The scrubbing action, due to passing the vapors through the bubble caps in the column 5, condenses the heavier fractions from the vapors, and these heavier fractions preferably pass off through pipes 23 and 21, as recycled stock from one of the lower trays of the tower, this stock being mixed with the raw charging stock and being again treated in the heating unit, etc.

The vapors which pass from the rectifier into the vapor phase treating tower 8, percolate downward through the catalyst which renders possible polymerization of certain unsaturated hydrocarbons into polymers which are higher boiling point compounds, that, as formed, condense under the operating conditions of the filter. These polymers, as well as any other condensates derived from the vapor in the filtering tower, gravitate down through the reticulated partition 15, and enter the polymer compartment. In that compartment, the heating coil 18b may raise the temperature of the same, so that lighter constituents which are undesired in the condensate may be evaporated out of the same and rise into the filtering medium.

When the condensate level rises to a predetermined elevation, the float control 19b automatically functions to open the valve 19a, with the result that condensates from the tower 8 pass out through pipes 19 and 19c.

It will be observed from the drawing that the tower 8 is preferably insulated and may have a steam jacket 8a, and that the vapors remaining after filtering through the catalyst, are caused to rise through the dephlegmator section 10, into the pipe 9, and the design of this section 10 is such that it acts as a dephlegmator to condense or knock back any polymers or other condensates which have been entrained by the vapors and passed through the screen 11, with the result that the vapors passing off to the condenser are almost entirely free from all objectionable coloring mater.

I do not wish to be restricted to the use of a jacket on the filter, or to the use of steam as a heating agent. If additional heat is not required, the filter might only be properly insulated, and where heat is required, I may employ the jacket with any means of heating, such as hot liquid or gases.

The vapor treating portion of my apparatus may be applied to any standard distilling or cracking plant, but I prefer the same to be employed with distilling or cracking apparatus including a rectifier.

As noted above, the oil may be cracked or be simply distilled, before introducing it into the rectifying column, and when treating heavy vapors, the latter may be passed through the tower 8 before entering the rectifier 5. To permit this, a valved pipe 7a connects pipes 4 and 7; a valved pipe 26b connects pipes 4 and 26; and a valved conduit 26c connects pipes 7 and 26, as shown in the drawing. When it is desired to pass the vapors from the pipe 4 through the filtering tower before passing them through the rectifier, the valves 4c and 7b in the lines 4 and 7 are closed, and the valves in the lines 7a and 26b are opened. Consequently, the vapors will pass through line 7a, tower 8, pipe 26, pipe 26b, pipe 4, rectifier 5 and conduit 26c to the condenser 27.

Attention is called to the fact that in my apparatus, the perforated partition 15, while separating the filtering material compartment from the condensate compartment of the tower 8, permits these two compartments to be under the same pressure.

As mentioned heretofore, my apparatus is also applicable to the desulphurizing of hydrocarbon vapors. For instance, I have found in working on raw gasolines produced from oil containing a high percentage of sulphur, that the vapors going over from the rectifying column also contain a high percentage of sulphur. By filtering such vapor in my apparatus, the resulting gasoline will be readily susceptible to caustic wash for the production of a noncorrosive product.

When the apparatus is used for decolorizing or desulphurizing, or both, I prefer to use a reflux agent at the top of the rectifying column. I may, for instance, pump an oil distillate or similar composition into the top tray of the tower through a pipe 29; this distillate being derived from an outside source, and being usually made up of off-colored distillates requiring re-running. The feeding of this reflux liquid may be accomplished by a small pump thermostatically controlled by the temperature at the head of the tower (not shown).

It will be understood from the foregoing that my apparatus may be employed for numerous purposes, including the removal of sulphur compounds and other organic sulphur compounds from vapors produced by cracking or fractional distilling hydrocarbon oils. My theory is that the organic compounds, particularly those containing sulphur are the ones which affect the color and stability of the gasoline, and it is by the removal of these compounds, rather than by mechanical filtering that the desired color and stability are secured.

My apparatus can be used on cracked vapors, light hydrocarbons, distilled vapors, or heavy lubricating fractions.

From the foregoing description, it is believed that the construction, operation and advantages of my apparatus may be clearly understood, and I am aware that changes may be made in the details disclosed without departing from the spirit of the invention as claimed.

What I claim and desire to secure by Letters Patent is:

1. In an apparatus of the class described, a chamber containing a catalyst, a perforated screen in the chamber supporting the catalyst, a cross pipe near the upper end of said chamber for the discharge of filtered vapors from the chamber, a pipe arranged within the chamber and extending downwardly from said cross pipe, a vapor outlet arranged at the lower end of the downwardly extending pipe and formed by perforated walls of the last mentioned pipe, means for introducing vapors into the top of said chamber, and means for discharging polymers from the lower portion of said chamber.

2. In an apparatus of the class described, a vertical tower having a vapor inlet at its upper end and a condensate outlet at its lower end, a perforated partition in the column above its bottom, a cross pipe arranged within the tower near the top of the same, a substantially vertical pipe within the chamber extending downwardly from the cross pipe to a position above said partition, a perforated vapor outlet arranged at the lower end of the substantially vertical pipe, and a catalyst arranged in the column on said partition and surrounding the substantially vertical pipe.

3. An apparatus as claimed in claim 2, in which the perforated partition is in the form of an inverted cone, and a valved outlet pipe for the catalyst is connected to the central portion of said cone.

4. An apparatus as claimed in claim 2, including means for admitting steam to the lower end of the column.

5. An apparatus of the class described, including a closed tower, a substantially horizontally disposed perforated partition dividing the interior of the tower into upper and lower communicating compartments, a catalyst occupying the upper compartment, means for introducing vapor into the upper portion of the upper compartment, a vapor outlet pipe having a portion arranged in the upper compartment and including a depending hollow leg enclosed by the catalyst, and means for discharging condensates from the lower end of said tower.

6. An apparatus as claimed in claim 5, including a heater arranged in the lower compartment of the tower.

7. An apparatus as claimed in claim 5, in which the last mentioned means includes a float controlled valve for maintaining a liquid level within the lower compartment, and heating means arranged in the lower compartment at an elevation below that of the liquid level maintained by said float control.

8. In an apparatus of the character described, a filtering tower having a vapor inlet at its top and provided with a perforated partition dividing the interior of the same into upper and lower compartments, a catalyst occupying the upper compartment, a vapor outlet pipe including a hollow drop leg enclosed by the catalyst and having a perforated intake at its lower end, float controlled means for discharging condensates from the lower compartment, means for heating the lower compartment, a condenser, and a conduit connecting said pipe with said condenser.

9. An apparatus for treating hydrocarbons in the vapor phase, comprising a tower having a vapor inlet at its top and containing a filtering agent having catalytic characteristics, a vertical pipe in the tower having an open lower end to permit vapors after passing through the filtering agent, to rise through said pipe, dephlegmating means obstructing said pipe, a perforated partition in the tower supporting said filtering agent, a condensate compartment located at the lower portion of the tower below said partition, means for withdrawing condensates from said compartment, and a vapor outlet pipe connected to the top of the first mentioned pipe.

10. In an apparatus of the character described, vaporizing means, a rectifier, a filtering tower containing a catalytic agent, said rectifier and filtering tower having a vapor inlet and a vapor outlet, and valved conduits connecting said inlets and outlets to the vaporizing means, and so arranged that vapors from the vaporizing means may be passed first through the rectifier and afterwards through the filtering tower or vice versa.

11. Apparatus of the class described comprising a chamber, a catalyst in the chamber, means for introducing vapors into said chamber so as to flow downwardly through the catalyst, a pipe embedded in the catalyst in the chamber through which vapors are withdrawn from the catalyst and the chamber, and means in the pipe for passing vapors counter-current to and in contact with condensate of said vapors.

12. Apparatus of the class described comprising a chamber, a catalyst in the chamber, means for introducing vapors into said chamber so as to flow downwardly through the catalyst, a pipe embedded in the catalyst in the chamber through which vapors are withdrawn from the catalyst and the chamber, and baffle trays in the pipe for passing the vapors counter-current to and in contact with condensate of said vapors.

13. Apparatus of the class described comprising a chamber, a catalyst in the chamber, means for introducing vapors into said chamber so as to flow downwardly through the catalyst, a polymer compartment in the chamber below the catalyst, a pipe embedded in the catalyst through which vapors are withdrawn from the catalyst and the chamber without passing through the polymer compartment, means in the pipe for passing vapors withdrawn from the catalyst counter-current to and in contact with condensate of the vapors, and heating means in the polymer compartment.

14. In combination, a shell, a fractionating tower arranged within said shell and forming a chamber therewith, means within said chamber for supporting solid adsorptive treating material for free drainage, said chamber having communication with the lower portion of said fractionating tower, a vapor inlet into said chamber, and a vapor outlet from said fractionating tower.

15. In combination, a shell, a fractionating column within said shell and forming a chamber therewith, means within said chamber for supporting solid adsorptive treating material for free drainage, said chamber having communication with the lower portion of said fractionating column, a vapor inlet into said chamber, a vapor outlet from said fractionating column, and means for draining liquid from said chamber and fractionating column.

16. In combination, a shell, a tower within said shell and forming a chamber therewith, means within said chamber for supporting solid adsorptive material for free drainage, said chamber having communication with the lower portion of said tower, trays within said tower, means for introducing vapors into said chamber, and means for withdrawing vapors from said tower.

17. In combination, a shell, a tower arranged within said shell and forming a chamber therewith, means within said chamber for supporting solid adsorptive material for free drainage, said chamber having communication with the lower portion of said tower, means for introducing vapors into said chamber, means for withdrawing vapors from said tower, and means within said tower for effecting fractional condensation of vapors passing therethrough.

18. In combination, a shell, a tower within said shell and forming a chamber therewith, means within said chamber for supporting solid adsorptive material for free drainage, said chamber having communication with the lower portion of said tower, means for introducing vapors into said chamber, means for withdrawing vapors from said tower, means within said tower for effecting fractional condensation of vapors passing therethrough, and means for draining liquid from said chamber and tower.

19. In combination, a shell, a column arranged within said shell and forming a chamber therewith, means within said chamber for supporting solid adsorptive treating material for free drainage, said chamber having communication with the lower portion of said column, a vapor inlet into said chamber, a vapor outlet from said column, and means within said column for removing polymers entrained in the vapor passing through the column.

20. In combination, a shell, a column arranged within said shell and forming a chamber therewith, means within said chamber for supporting solid adsorptive treating material for free drainage, said chamber having communication with the lower portion of said column, a vapor inlet into said chamber, a vapor outlet from said column, and means obstructing said column for removing polymers entrained in the vapor passing through the column.

21. In combination, a shell, a column arranged within said shell and forming a chamber therewith, means within said chamber for supporting solid adsorptive treating material for free drainage, said chamber having communication with the lower portion of said column, a vapor inlet into said chamber, and a vapor outlet from said column, said column having spaced, superposed plates therein.

22. In combination, a shell, a column arranged within said shell and forming a chamber therewith, means within said chamber for supporting solid adsorptive treating material for free drainage, said chamber having communication with the lower portion of said column, a vapor inlet into said chamber, and a vapor outlet from said column, said column having spaced, superposed plates therein containing condensate of the vapors passing through the column.

JAMES M. WADSWORTH.